(12) United States Patent
Xu et al.

(10) Patent No.: US 8,047,293 B2
(45) Date of Patent: Nov. 1, 2011

(54) FLOW-ACTUATED ACTUATOR AND METHOD

(75) Inventors: Yang Xu, Houston, TX (US); Richard Xu, Tomball, TX (US); Ronnie David Russell, Cypress, TX (US); Namhyo Kim, Houston, TX (US); Lale Korkmaz, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 173 days.

(21) Appl. No.: 12/469,272

(22) Filed: May 20, 2009

(65) Prior Publication Data
US 2010/0294508 A1 Nov. 25, 2010

(51) Int. Cl.
*E21B 34/06* (2006.01)

(52) U.S. Cl. .................. 166/332.1; 166/332.8

(58) Field of Classification Search ............... 166/332.1, 166/332.8, 334.1
See application file for complete search history.

(56) References Cited

U.S. PATENT DOCUMENTS

| | | |
|---|---|---|
| 3,151,839 A | 10/1964 | Mott |
| 3,973,586 A | 8/1976 | Hill et al. |
| 4,161,219 A | 7/1979 | Pringle |
| 4,215,748 A | 8/1980 | Pace et al. |
| 4,274,490 A | 6/1981 | Huckaby |
| 4,362,214 A | 12/1982 | Pringle et al. |
| 4,373,587 A | 2/1983 | Pringle |
| 4,601,342 A | 7/1986 | Pringle |
| 4,834,183 A | 5/1989 | Vinzant et al. |
| 4,856,557 A | 8/1989 | Watson |
| 5,004,007 A | 4/1991 | Johnson et al. |
| 5,040,606 A | 8/1991 | Hopper |
| 5,050,839 A | 9/1991 | Dickson et al. |
| 5,095,994 A | 3/1992 | Dollison |
| 5,179,973 A | 1/1993 | Dickson et al. |
| 5,310,005 A | 5/1994 | Dollison |
| 5,752,569 A | 5/1998 | Bhavsar et al. |
| 6,302,210 B1 | 10/2001 | Crow et al. |
| 6,394,187 B1 | 5/2002 | Dickson et al. |
| 6,668,935 B1 | 12/2003 | McLoughlin et al. |
| 6,877,564 B2 | 4/2005 | Layton et al. |
| 6,902,006 B2 | 6/2005 | Myerley et al. |
| 7,021,386 B2 | 4/2006 | Vick, Jr. et al. |
| 7,137,452 B2 | 11/2006 | McVicker |
| 7,210,498 B2 | 5/2007 | Arigoni |
| 7,213,653 B2 | 5/2007 | Vick, Jr. |
| 7,270,191 B2 | 9/2007 | Drummond et al. |
| 7,347,270 B2 | 3/2008 | McMillan et al. |

(Continued)

OTHER PUBLICATIONS

Pierce, P. E., et al., "Flow Closing Coefficients from Water Flow Tests for Subsurface Controlled Safety Valves (API-SSCSV's)," Fall Meeting of the Society of Petroleum Engineers of AIME, Dallas, Texas, Sep. 28, 1975-Oct. 1, 1975, Paper No. 5601-MS.

(Continued)

*Primary Examiner* — William P Neuder
(74) *Attorney, Agent, or Firm* — Cantor Colburn LLP

(57) ABSTRACT

Disclosed herein is a flow-actuated actuator. The actuator includes, a tubular movable relative to a structure within which the tubular is positionable, and a plurality of full bore flow-resisting elements disposed at the tubular, the plurality of full bore flow-resisting elements having a greater resistance to fluid flow therethrough than any one of the plurality of full bore flow-resisting elements has alone.

18 Claims, 4 Drawing Sheets

U.S. PATENT DOCUMENTS

| | | | |
|---|---|---|---|
| 7,363,980 B2 | 4/2008 | Pringle | |
| 7,409,996 B2 | 8/2008 | Myerley et al. | |
| 7,455,115 B2 * | 11/2008 | Loretz et al. | 166/373 |
| 7,575,058 B2 * | 8/2009 | Franco et al. | 166/334.4 |
| 7,690,432 B2 * | 4/2010 | Noske et al. | 166/319 |
| 2001/0007284 A1 | 7/2001 | French et al. | |
| 2003/0121665 A1 * | 7/2003 | Trott et al. | 166/332.8 |
| 2006/0070744 A1 | 4/2006 | Smith | |
| 2006/0124315 A1 * | 6/2006 | Frazier et al. | 166/369 |
| 2006/0162939 A1 | 7/2006 | Vick, Jr. et al. | |
| 2007/0137869 A1 | 6/2007 | MacDougall et al. | |
| 2007/0246225 A1 * | 10/2007 | Hailey et al. | 166/386 |
| 2007/0295515 A1 | 12/2007 | Veneruso et al. | |
| 2008/0164035 A1 | 7/2008 | Bolding et al. | |
| 2008/0196898 A1 | 8/2008 | Jasser et al. | |
| 2008/0210438 A1 | 9/2008 | Bolding et al. | |
| 2008/0230231 A1 | 9/2008 | Bolding et al. | |
| 2008/0245531 A1 | 10/2008 | Noske et al. | |

OTHER PUBLICATIONS

Pedigo, John, et al., "An Acoustically Controlled Down-Hole Safety Valve (SCSSSV)," SPE Annual Fall Technical Conference and Exhibition, New Orleans, Louisiana, Oct. 3-6, 1976, Paper No. 6026-MS.

Surbey, D.W., et al., "Study of Subcritical Flow Through Multiple-Orifice Valves," SPE Production Engineering, vol. 3, No. 1, Feb. 1988, Paper No. 14285-PA.

Bolding, J.L., et al., "Damaged Control Line Replacement Safety Valve System: Thru-Tubing," SPE/ICoTA Coiled Tubing & Well Intervention Conference and Exhibition, Mar. 31-Apr. 1, 2009, The Woodlands, Texas, Paper No. 121407-MS.

* cited by examiner

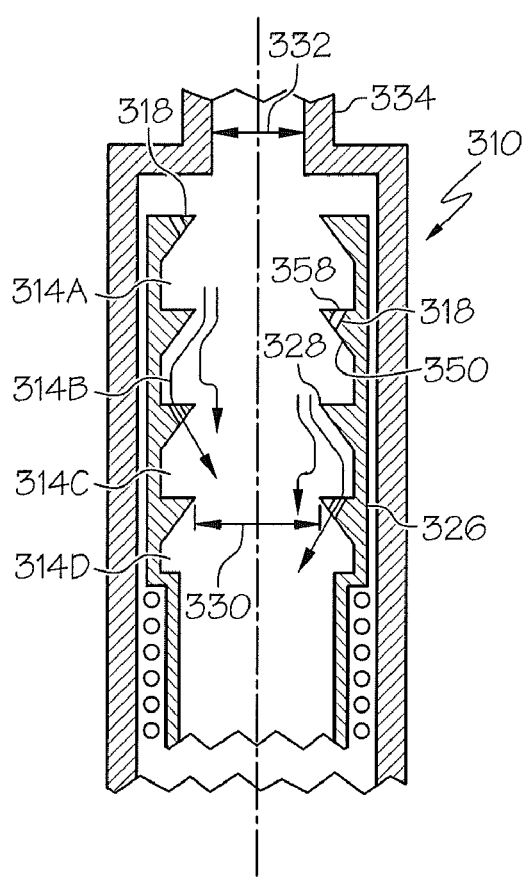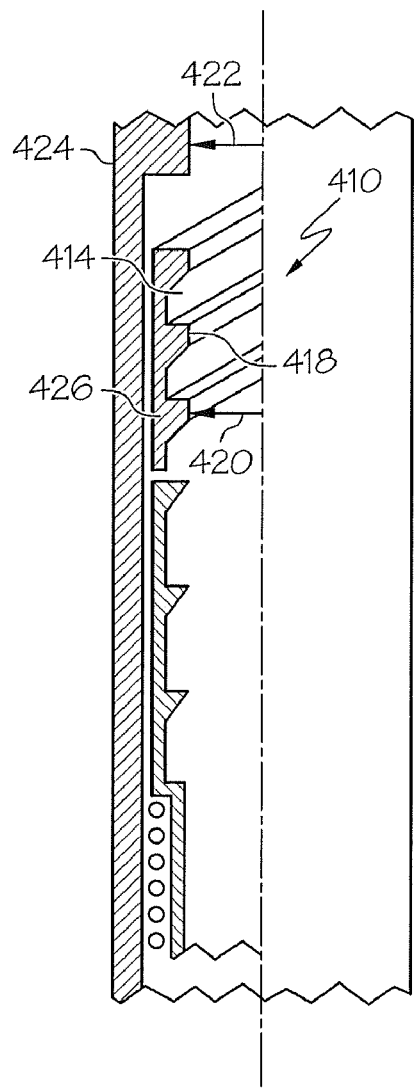
FIG. 5
FIG. 6

US 8,047,293 B2

FLOW-ACTUATED ACTUATOR AND METHOD

BACKGROUND

Downhole system operators are always receptive to new methods and devices to permit actuation of tools located downhole within a downhole system. Increasing flow rates of fluid pumped from surface can and has been harnessed as a method to permit actuation of a number of different types of devices in the downhole environment. In such methods downhole actuators typically use reduced diameter elements that resist fluid flow resulting in actuation forces that are proportional to the flow rate. While these work well for their intended purpose, the reduced diameter elements can limit other operations simply due to diametrical patency. Commonly then such actuators must be removed from the downhole system to allow full bore access. Devices and methods that permit actuation based on flow while not incurring the drawback noted would be well received in the art.

BRIEF DESCRIPTION

Disclosed herein is a flow-actuated actuator. The actuator includes, a tubular movable relative to a structure within which the tubular is positionable, and a plurality of full bore flow-resisting elements disposed at the tubular, the plurality of full bore flow-resisting elements having a greater resistance to fluid flow therethrough than any one of the plurality of full bore flow-resisting elements has alone.

Further disclosed herein is a method of actuating a device. The method includes, positioning a tubular having a plurality of full bore flow-resisting elements within a structure, flowing fluid through the tubular, urging the tubular in a direction of fluid flow with flow resistance created by fluid flowing over the plurality of full bore flow-resisting elements, and actuating a device with the urging of the tubular.

Further disclosed herein is a flow-actuated actuator. The actuator includes, a tubular having a plurality of full bore flow-resisting features formed therein, the flow-actuated actuator is longitudinally movable relative to a structure within which the tubular is positionable, the plurality of full bore flow-resisting features creating a greater resistance to fluid flow therethrough than any one of the plurality of full bore flow-resisting features creates alone.

BRIEF DESCRIPTION OF THE DRAWINGS

The following descriptions should not be considered limiting in any way. With reference to the accompanying drawings, like elements are numbered alike:

FIG. 5 depicts a partial cross sectional view of another flow-actuated actuator disclosed herein with ports fluidically connecting adjacent flow-resisting elements; and FIG. 6 depicts a partial cross sectional view of another flow-actuated actuator disclosed herein with helically shaped flow-resisting elements.

DETAILED DESCRIPTION

A detailed description of one or more embodiments of the disclosed apparatus and method are presented herein by way of exemplification and not limitation with reference to the Figures.

Figures 1, 2:
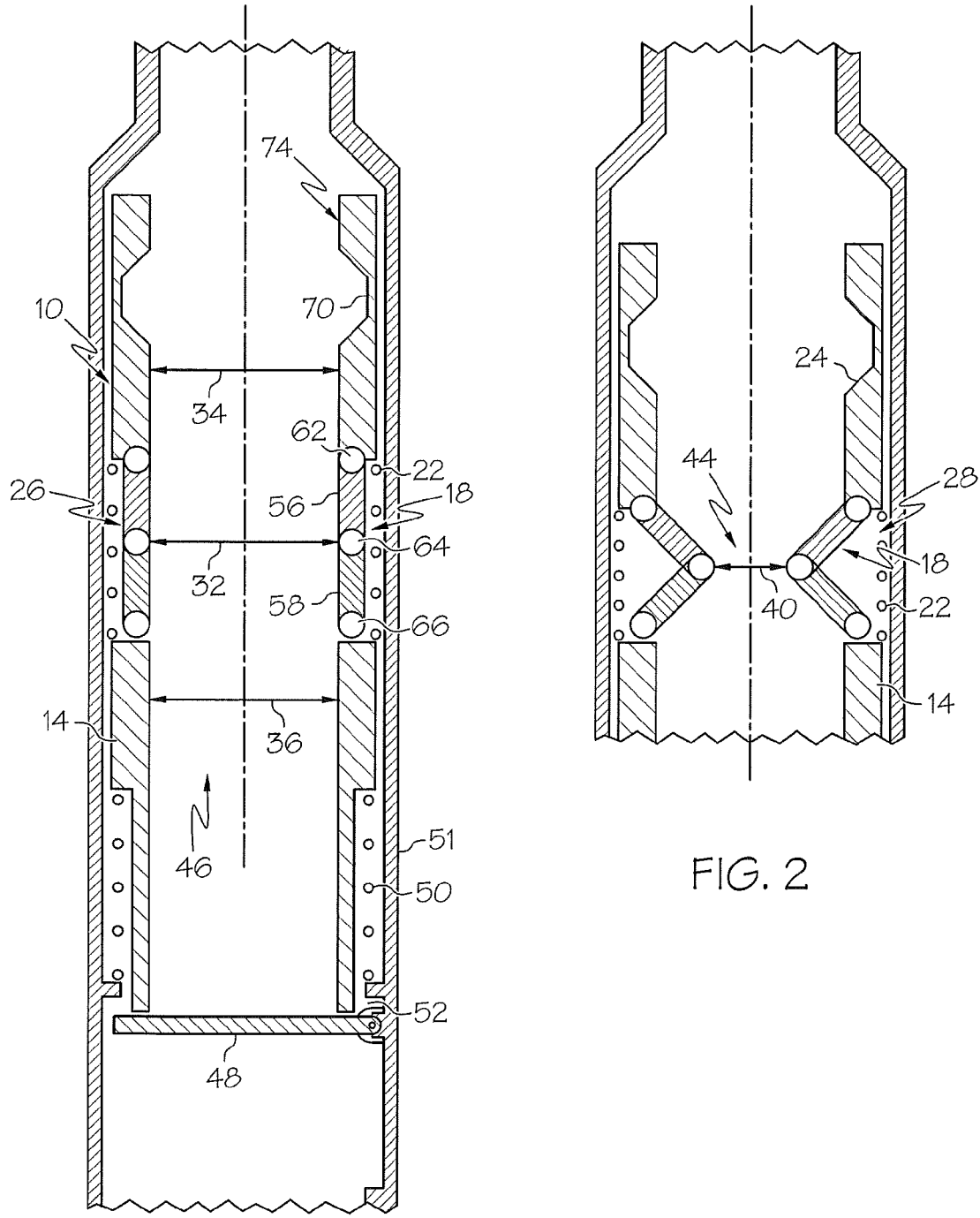
FIG. 1 depicts a partial cross sectional view of a flow-actuated actuator disclosed herein shown in a non-actuated position.
FIG. 2 depicts a partial cross sectional view of the flow-actuated actuator of FIG. 1, shown in a flow actuating position.

Referring to FIGS. 1 and 2, an embodiment of a flow-actuated actuator 10 is illustrated generally at 10. The actuator 10 is a full bore actuator that, when non-actuated does not present its own restriction to flow. Rather the actuator presents an unencumbered full bore. As such, the actuator 10 creates no obstruction to downhole intervention, for example, when in a non-actuating position yet provides a mechanism and method for actuating a downhole tool in response to fluid flow when in an actuating position. Although embodiments depicted herein are in reference to downhole applications, it should be noted that the flow-actuated actuators described herein are not limited to downhole applications, and as such can be used in any application needing a flow-actuated actuator.

The actuator 10 includes, a tubular 14, a movable member 18, a biasing member 22 and a flow resistor 24. The movable member 18 is movable between a first position 26 (shown in FIG. 1), which may also be referred to as the non-actuating position; and a second position 28 (shown in FIG. 2), which may be referred to as the actuating position. The biasing member 22, depicted in this embodiment as a compression spring, biases the movable member 18 toward the first position 26. In the first position 26 neither a minimum radial dimension 32 of the movable member 18 nor a minimum radial dimension 34 of the flow resistor 24 is smaller than a smallest radial dimension 36 of the tubular 14. However, in the second position 28, the movable member 18 has a minimum dimension 40 that is substantially smaller than the smallest radial dimension 36 of the tubular 14. As such, the movable member 18 when in the second position 28 forms a reduced flow area 44 at the minimum dimension 40 in comparison to the minimum flow area 46 of the tubular 14. This reduced flow area 44 creates a pressure drop due to fluid flowing, for example, fluid injected from surface, therethrough and consequently an urging force on the actuator 10 that is proportional to the fluid flow. This urging force can be used to move the tubular 14 and actuate a tool such as in fully opening a flapper 48 sealedly engaged with an outlet end 52 of the tubular 14, for example. Although the flapper 48 can partially open in response to fluid flow it may not fully open until the tubular 14 contacts the flapper 48 during longitudinal movement thereof. A biasing element 50 that biases the tubular 14 relative to a housing 51, illustrated herein as a compression spring, is longitudinally compressed to a smaller longitudinal length when the tubular 14 is moved due to the urging forces.

In this embodiment, the movable member 18 has a plurality of first links 56 and a plurality of second links 58. The first links 56 are pivotally attached to the flow resistor 24 at a first pivot 62 on one end and pivotally attached to the second links 58 at a second pivot 64 at the other end. Similarly, the second links 58 are pivotally attached to the first links 56 at the second pivot 64 at one end and pivotally attached to the tubular 14 at a third pivot 66 at the other end. This construction allows the second pivot 64 to be moved radially inwardly to form the minimum dimension 40 in response to movement of the flow resistor 24 toward the tubular 14, with the biasing member 22 being compressed in the process.

A flow interacting detail 70 on the flow resistor 24, illustrated herein as an annular groove on an inner surface 74 of the flow resistor 24 interacts with the fluid flow to create an urging force on the flow resistor 24 that is proportional to the fluid flow. The interacting detail 70 (as the annular groove illustrates) can be formed without reducing the minimum dimension 34 of the flow resistor 24. Doing so allows full bore access to take place through the actuator 10, as mentioned above, without the need to remove the actuator 10 from the well bore. The biasing member 22 is selected to allow the flow resistor 24 to move relative to the tubular 14 with relatively little urging force applied to the flow resistor 24. Once the flow resistor 24 begins moving toward the tubular 14 the urging force on the flow resistor 24 quickly increases since the minimum dimension 32 begins reducing toward the minimum dimension 40 thereby reducing the flow area therethrough and increasing the pressure drop associated with the fluid flow.

The biasing element 50 is selected to have a greater biasing force on the tubular 14 than the biasing member 22 has on the flow resistor 24. This assures that the flow resistor 24 moves before the tubular 14 moves. In fact, the biasing element 50 can be selected such that the tubular 14 does not move unless the movable member 18 has been moved to the second position 28 wherein the forces generated by the flowing fluid are substantially greater due to the flow restriction created by the reduced flow area 44 formed by the movable member 18.

The biasing member 22 and the biasing element 50 are also selected to have sufficient biasing forces to reset both the flow resistor 24 and the tubular 14 to their original, non-flow actuated positions, as illustrated in FIG. 1 in response to cessation of fluid flow.

Figure 3:
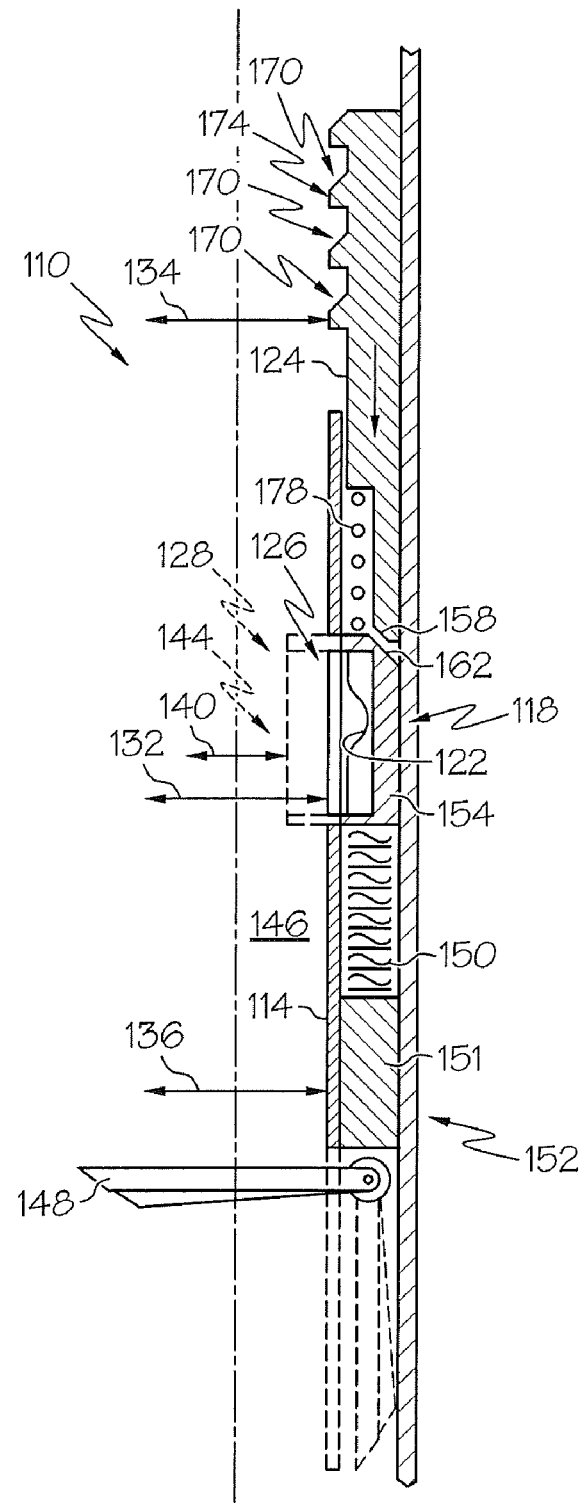
FIG. 3 depicts a partial cross sectional view of another flow-actuated actuator disclosed herein shown in a non-actuated position.

Referring to FIG. 3, an alternate embodiment of a flow-actuated actuator 110 disclosed herein is illustrated. The flow-actuated actuator 110 includes, tubular 114, a movable member 118, a biasing member 122 and a flow resistor 124. The movable member 118 is movable between a first position 126, as illustrated herein in solid lines, and a second position 128, as illustrated herein in phantom lines. As with the first embodiment, the second position 128 may also be referred to as the actuating position. The biasing member 122, depicted herein as a leaf spring, biases the movable member 118 toward the first position 126. In the first position 126 neither a minimum radial dimension 132 of the movable member 118 nor a minimum radial dimension 134 of the flow resistor 124 is smaller than a smallest radial dimension 136 of the tubular 114. However, in the second position 128, the movable member 118 has a minimum dimension 140 that is substantially smaller than the smallest radial dimension 136 of the tubular 114. As such, the movable member 118 when in the second position 128 forms a reduced flow area 144 at the minimum dimension 140 in comparison to the minimum flow area 146 of the tubular 114. This reduced flow area 144 creates a pressure drop due to fluid flowing therethrough and consequently an urging force on the actuator 110 that is proportional to the fluid flow. This urging force can be used to move the tubular 114 and actuate a tool such as in opening a flapper 148 sealedly engaged with an outlet end 152 of the tubular 114, for example. A biasing element 150 that biases the tubular 114 relative to a housing 151, illustrated herein as a series of wave springs, is longitudinally compressed to a smaller longitudinal length when the tubular 114 is moved due to the urging forces.

In this embodiment, the movable member 118 has a plurality of orifice dogs 154 substantially oriented about a longitudinal axis of the tubular 114. The orifice dogs 154 are moved from the first position 126 to the second position 128 in response to longitudinal movement of the flow resistor 124. This longitudinal movement of the flow resistors 124 causes ramped extenders 158 thereon to engage ramped surfaces 162 on the orifice dogs 154 moving the orifice dogs 154 to the second position 128 against the biasing of the biasing members 122 to form the minimum dimension 140.

A plurality of flow-resisting elements 170 on the flow resistor 124, illustrated herein as annular grooves on an inner surface 174 of the flow resistor 124, interacts with the fluid flow to create an urging force on the flow resistor 124 that is proportional to the fluid flow. The annular groove flow-resisting elements 170, in this embodiment are formed without reducing the minimum dimension 134 of the flow resistor 124. Doing so allows full bore access through the actuator 110, as mentioned above, without the need to remove the actuator 110 from the well bore. A biasing member 178 is set to bias the flow resistor 124 against a direction of the fluid flow. A biasing force of the biasing member 178 is selected to permit the flow resistor 124 to move relative to the tubular 114 with relatively little urging force applied to the flow resistor 124. Once the flow resistor 124 begins moving toward the tubular 114 the urging force on the orifice dogs 154 generated by the fluid flow quickly increases since the minimum dimension 132 begins reducing toward the minimum dimension 140 thereby reducing the flow area therethrough and increasing the pressure drop associated with the fluid flow.

The biasing element 150 is selected to have a greater biasing force on the tubular 114 than the biasing member 178 has on the flow resistor 124. This assures that the flow resistor 124 moves before the tubular 114 moves. In fact, the biasing element 150 can be selected such that the tubular 114 does not move unless the movable member 118 has been moved to the second position 128 wherein the forces generated by the flowing fluid are substantially greater due to the flow restriction created by the reduced flow area 144 formed by the movable member 118.

The biasing member 122, the biasing element 150 and the biasing member 178 are also selected to have sufficient biasing forces to reset the orifice dogs 154, the tubular 114, and the flow resistor 124 to their original, non-flow actuated positions, as illustrated in solid lines in FIG. 3 in response to cessation of fluid flow.

Figure 4:
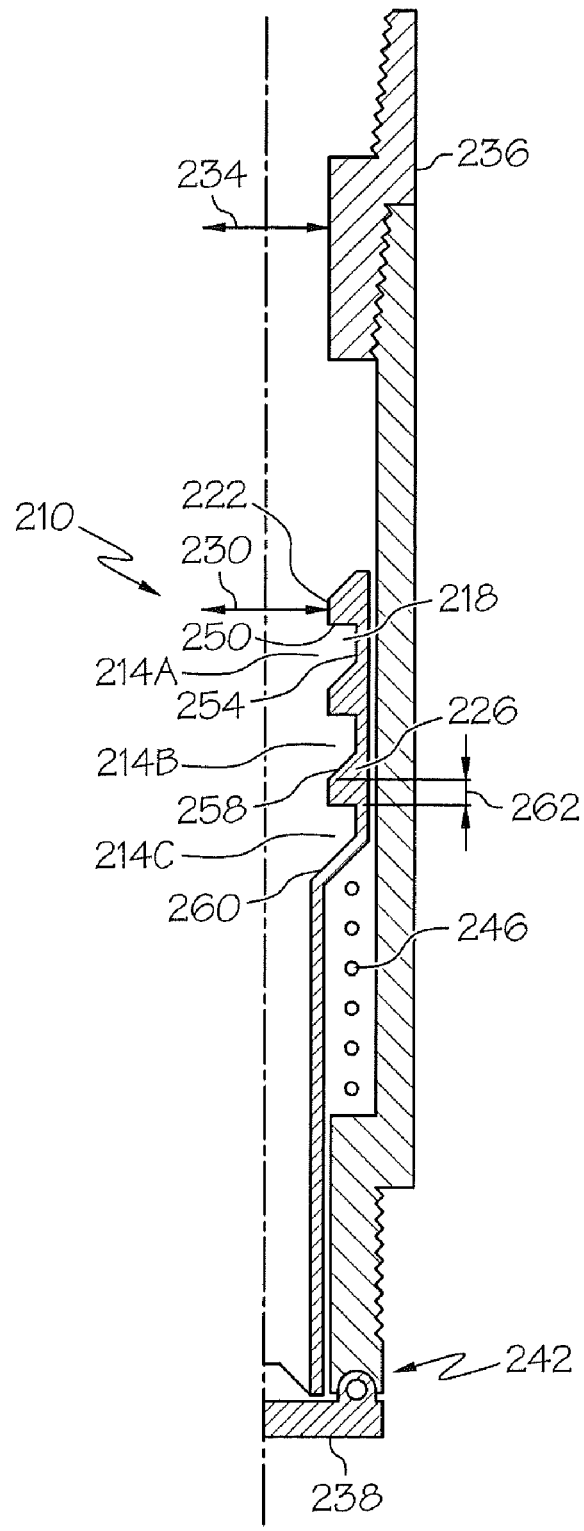
FIG. 4 depicts a partial cross sectional view of another flow-actuated actuator disclosed herein shown in a non-actuated position.

Referring to FIG. 4, an alternate embodiment of a flow-actuated actuator 210 is illustrated. Unlike the actuators 10 and 110 described above, the actuator 210 does not have a movable member configured to reduce a flow area. Instead, the actuator 210 has a plurality of flow-resisting elements 214, with three being illustrated. Each of the flow-resisting elements 214, in this embodiment, consists of an annular groove 218 recessed into an inner wall 222 of a tubular flow resistor 226 thereby forming a profiled full-bore inner surface. The inner wall 222 having a smallest dimension 230 no smaller than a smallest dimension 234 of areas of the drillstring beyond the actuator 210. The flow-resisting elements 214A-214C are configured to agitate fluid flowing thereby into a turbulent flow. The turbulation created by each of the flow-resisting elements 214A-214C increases a total urging force on the actuator 210 from the flowing fluid. The result being the flow-actuated actuator 210 having greater urging forces acting thereon due to the plurality of flow-resisting elements 214 than a device having a singular flow-resisting element 214.

In this embodiment, the flow resistor 226 is a flow tube with a flapper 238 sealable to a downstream end 242. The flow resistor 226 is biased in an upstream direction by a biasing member 246 depicted here as a compression spring. A biasing member, such as a coil spring (not shown), for example, biases the flapper 238 toward the sealing position. The foregoing structure maintains the flow resistor 226 in an upstream orientation with the flapper 238 sealed thereto when fluid is not flowing. Flowing fluid acting upon the flow resistor 226 causes the flow resistor 226 to move downstream against the biasing forces to fully open the flapper 238.

In this embodiment, the flow resistor 226 has details specifically configured to increase urging force acting thereon by fluid flow. For example, angles of the walls 250, 254, 258 that define the flow-resisting elements 214 with respect to a longitudinal axis of the flow resistor 226 can be selected to increase interaction with the fluid. In this embodiment, the leading wall 250 is substantially perpendicular to the longitudinal axis, while the annular wall 254 is substantially parallel to the longitudinal axis and the trailing wall forms approximately a 45 degree angle with the longitudinal axis. The 45 degree angle forms a ramped surface 260. Alternate angles of all three walls 250, 254, 258 can be selected for specific applications and specific flow rates. Similarly, a longitudinal dimension 262 between any two adjacent flow-resisting elements 214 may be selected to optimize urging forces generated by fluid interacting with downstream flow-resisting element 214.

Referring to FIG. 5, an alternate embodiment of a flow-actuated actuator 310 with a flow resistor 326 is illustrated. The flow resistor 326 includes four flow-resisting elements 314A-314D formed in an inner surface 328 of the flow resistor 326. The inner surface 328 has a smallest dimension 330 no smaller than a smallest dimension 332 found elsewhere along a drillstring 334. Each of the flow-resisting elements 314A-314D have at least one hole 318, or port, bored through a leading wall 350 of one flow-resisting element 314 and through a trailing wall 358 of an adjacent flow-resisting element 314. Fluid within one of the flow-resisting elements 314 can be ported through the hole 318 and into the adjacent flow-resisting element 314, resulting in increased fluidic drag on the flow resistor 326 in comparison to a flow resistor without the holes 318. Such an increase in fluidic drag causes a greater urging force on the flow resistor 326 from the flowing fluid. The increased urging force is capable of applying a greater actuating force on a downhole tool. Alternate embodiments can use notches (not shown), or other geometric removal of material other than the ports 318, cut into the leading wall 350 of one flow-resisting element 314 and connecting to the trailing wall 358 of an adjacent flow-resisting element 314.

Referring to FIG. 6, another embodiment of a flow-actuated actuator 410 having a flow resistor 426 is illustrated. The flow resistor 426 includes flow-resisting elements 414 that form a helical groove in an inner surface 418 thereof. The inner surface 418 having a smallest dimension 420 no smaller than a smallest dimension 422 elsewhere along a drillstring 424 aligned with the actuator 410. The helical shape of the flow-resisting elements 414 induces a swirling action about a longitudinal axis of the flow resistor 426 in fluid flowing therethrough. The rotating motion of the swirling fluid generates centripetal force in the fluid that is imparted against the flow resistor 426. This increase in force between the fluid and the flow resistor 426 also increases the longitudinal urging force that the fluid imparts on the flow resistor 426, thereby increasing an actuation force of the flow-actuated actuator 410.

The flow-resisting elements 314 and 414 of actuators 310 and 410 respectively include details configured to cause turbulation of the fluid flowing thereby. For example, fluid turbulated by the first flow-resisting element 314A interacts with downstream flow-resisting elements 314B and 314C to create a greater urging force on the flow resistor 326 than would be created had the first flow-resisting element 314A not been present. Similarly, turbulence caused by the first flow-resisting element 314A and the second flow-resisting element 314B creates a greater urging force on the third flow-resisting element 314C than would be created had the second flow-resisting element 314B not been present. This cumulative effect builds upon whatever number of flow-resisting elements 314 and 414 are utilized.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A flow-actuated actuator, comprising:
a tubular movable relative to a structure within which the tubular is positionable with neither the tubular nor the structure having flow dimensions less than full bore; and
a plurality of full bore flow-resisting elements disposed at the tubular, the plurality of full bore flow-resisting elements having a greater resistance to fluid flow therethrough than any one of the plurality of full bore flow-resisting elements has alone, and the tubular being configured to actuatingly move relative to the structure in response to resistance to fluid flow through the plurality of full bore flow-resisting elements.

2. The flow-actuated actuator of claim 1, further comprising a biasing member longitudinally biasing the tubular relative to a structure.

3. The flow-actuated actuator of claim 1, wherein the tubular is a flow tube of a subsurface valve.

4. The flow-actuated actuator of claim 1, wherein the plurality of full bore flow-resisting elements includes longitudinally displaced recesses in an inner wall of the tubular.

5. The flow-actuated actuator of claim 4, wherein a plurality of walls define the longitudinally displaced recesses and at least one of the plurality of walls includes a longitudinally ramped surface.

6. The flow-actuated actuator of claim 5, wherein the longitudinally ramped surface is on a downstream side of the longitudinally displaced recesses as defined by a direction of fluid flow.

7. The flow-actuated actuator of claim 4, wherein a plurality of ports fluidically connect some of the longitudinally displaced recesses with others of the longitudinally displaced recesses adjacent thereto.

8. The flow-actuated actuator of claim 1, wherein the plurality of full bore flow-resisting elements forms a helix.

9. The flow-actuated actuator of claim 8, wherein the helix is configured to induce a rotational swirl about a longitudinal axis of the tubular to fluid flowing therethrough.

10. A method of actuating a device, comprising:
   positioning a tubular having a plurality of full bore flow-resisting elements within a structure;
   flowing fluid through the tubular;
   urging the tubular in a direction of fluid flow with flow resistance created by fluid flowing over the plurality of full bore flow-resisting elements; and
   actuating a device with the urging of the tubular.

11. The method of actuating the device of claim 10, further comprising biasing the tubular in a direction opposite to the direction of flow.

12. The method of actuating the device of claim 10, further comprising injecting fluid from surface.

13. The method of actuating the device of claim 10, further comprising turbulating flow with the plurality of full bore flow-resisting elements.

14. The method of actuating the device of claim 13, wherein the turbulating flow increases fluidic urging forces on the tubular.

15. The method of actuating the device of claim 10, further comprising generating increased urging force on the tubular through selective spacing of adjacent full bore flow-resisting elements.

16. The method of actuating the device of claim 10, further comprising porting flow between adjacent full bore flow-resisting elements.

17. The method of actuating the device of claim 10, further comprising inducing rotation in the flow.

18. A flow-actuated actuator, comprising a tubular having a plurality of full bore flow-resisting features formed therein, the flow-actuated actuator being longitudinally movable relative to a structure within which the tubular is positionable the structure having minimum flow dimensions no less than full bore, the plurality of full bore flow-resisting features creating a greater resistance to fluid flow therethrough than any one of the plurality of full bore flow-resisting features creates alone, and the tubular being configured to actuatingly move relative to the structure in response to resistance to fluid flow through the plurality of full bore flow-resisting features.

\* \* \* \* \*